(12) United States Patent
Fukutani et al.

(10) Patent No.: US 7,141,102 B2
(45) Date of Patent: *Nov. 28, 2006

(54) ANTIFREEZE SOLUTION AND RUST INHIBITOR ADDED THERETO

(75) Inventors: Yasuo Fukutani, Shiga (JP); Etsushi Tanaka, Shiga (JP); Yukio Wada, Hikone (JP)

(73) Assignee: Kikuko Fukutani, Shiga (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/543,845

(22) PCT Filed: Jan. 29, 2004

(86) PCT No.: PCT/JP2004/000875

§ 371 (c)(1),
(2), (4) Date: Jul. 29, 2005

(87) PCT Pub. No.: WO2004/074397

PCT Pub. Date: Sep. 2, 2004

(65) Prior Publication Data

US 2006/0038159 A1    Feb. 23, 2006

(30) Foreign Application Priority Data

Jan. 29, 2003  (JP) ............... 2003-020092
May 12, 2003  (JP) ............... 2003-133470

(51) Int. Cl.
*C23F 11/12*  (2006.01)
*C09K 5/20*   (2006.01)
*C09K 3/00*   (2006.01)
*C09K 3/18*   (2006.01)

(52) U.S. Cl. ............... 106/14.44; 106/14.11; 106/14.13; 106/14.14; 106/14.15; 106/14.16; 106/14.41; 106/14.42; 252/390; 252/392; 252/393; 252/394; 252/396

(58) Field of Classification Search ............ 106/14.13, 106/14.14, 14.15, 14.16, 14.41, 14.42, 14.44, 106/14.11; 252/390, 392, 393, 394, 396
See application file for complete search history.

(56) References Cited

U.S. PATENT DOCUMENTS 5,718,836 A * 2/1998 Nakatani et al. ............ 252/74
6,488,749 B1 * 12/2002 Fukutani et al. ......... 106/14.42

FOREIGN PATENT DOCUMENTS

| EP | 000564721 A1 * | 10/1993 |
|---|---|---|
| JP | 07-157866 | 6/1995 |
| JP | 11-61095 | 3/1999 |
| JP | 2000-204343 | 7/2000 |
| JP | 2002-060726 | 2/2002 |
| JP | 2002-097461 | 4/2002 |

* cited by examiner

*Primary Examiner*—Anthony J. Green
(74) *Attorney, Agent, or Firm*—Milde & Hoffberg, LLP

(57) ABSTRACT

An object of the present invention is to provide an antifreeze solution which is used by adding it to a heating medium of a heat exchanger or a radiator coolant for an internal combustion car engine, which can be used to prevent the icing of road surfaces, which is easy to use and environmentally friendly, and which does not contain environmentally harmful substances such as ethylene glycol so that it can be easily treated for disposal after use. Another object of the present invention is to provide an antifreeze solution which contains water as a main component and glycerin. The undiluted antifreeze solution does not freeze even at −20° C. or less at normal pressures and is composed of components at a certain ratio.

11 Claims, 1 Drawing Sheet

ANTIFREEZE SOLUTION AND RUST INHIBITOR ADDED THERETO

FIELD OF THE INVENTION

The present invention relates to an antifreeze solution that is added to a heating medium of a heat exchanger or a radiator coolant for an internal combustion car engine, and further to an antifreeze solution that does not freeze even at low temperature, so that it can be used as an antifreezing agent for preventing the icing of road surfaces.

BACKGROUND OF THE INVENTION

When water freezes into ice at 0° C. or less, it swells by about 10%. If a coolant for cooling a heat exchanger such as a car engine freezes like water, a radiator or an engine block gets damaged. For this reason, the coolant for cooling a car engine has been conventionally prevented from freezing by adding a chemical having a low freezing point thereto and then using it after dilution. Such chemical to be added to the coolant contains glycols or alcohols as a main component. Further, in order to prevent metal corrosion and extend the service life of the metal, a rust inhibitor, a corrosion inhibitor, and an antioxidant are added (See "what is claimed is" of Japanese Unexamined Patent Publication No. (Patent Kokai No.) 07-157886 (1995) and "what is claimed is" of Japanese Unexamined Patent Publication No. 2002-97461, for example). Conventionally, a large amount of ethylene glycol has been used as a radiator coolant.

Particularly, in the winter season in a cold district, a passenger or a car slips on the road because the road freezes due to rainfall, snowfall, or frost or snow is trodden down on the road, and thus accidents and traffic jam are caused. In view of smooth traffic flow and transportation and prevention of danger, it is inevitable to take measures to melt snow on the road surface and to prevent freezing of the road surface. Therefore, the central or each local government or road maintenance industry distributes various antifreezing agents over the road surface to prevent freezing of the road surface. Specifically, an antifreezing agent containing sodium chloride and calcium chloride as a main component (See "what is claimed is" of Japanese Unexamined Patent Publication No. 11-061095 (1999), "what is claimed is" of Japanese Unexamined Patent Publication No. 2000-204343, and "what is claimed is" of Japanese Unexamined Patent Publication No. 2002-060726, for example) is distributed over the road. The distributed antifreezing agent melts in water on the road and increases the concentration of salt in the water, thus lowering the freezing temperature of the water. Also, the antifreezing agent melts snow or ice on the road by its own melting heat.

However, considering danger to environment, human body and animals, there has been a growing trend to regulate an additive contained in such antifreezing agent. Examples of substances which are likely to be regulated as harmful air contaminants include: sulfur base additives; chlorine base additives; boron compounds; nitrite and derivatives thereof; formaldehyde and derivatives thereof; amines such as hydroxylamine, diethanolamine, nitrosamines, and triethanolamine; PCP; PCB; other dioxin-containing substances; heavy metals; and ethylene glycol.

The aforementioned prior art antifreeze solution contains the substances described above. For this reason, it has been desired to develop a novel antifreeze solution containing no environmentally harmful substances.

In the meanwhile, an antifreezing agent for preventing the icing of the road surfaces contains chloride. Therefore, such antifreezing agent causes metal components that constitute a car, coating for protecting an electric system, and tires to rust and deteriorate. Further, such antifreezing agent causes the scaling deterioration of concrete or asphalt. When such antifreezing agent melt in water, it contaminates the soil around the road and exerts an adverse effect on living animal and plant life. Considering such effect, some municipalities stop using chloride and use acetic acid instead of chloride. However, since acetic acid is much more expensive than chloride, it is not possible to use a large amount of acetic acid. For this reason, some municipalities blockade the icy road. Therefore, it has been desired to develop a cheap and environmentally friendly antifreezing agent.

As a snow-melting agent for melting snow on the roof or the like, there has been used hot water so far. However, hot water freezes as temperature drops. Therefore, snow cannot often be removed.

As the result of our researches to provide a novel antifreeze solution that can be used as a radiator coolant, antifreezing agent, snow-melting agent, or the like, the inventor of the present invention has eventually found the present invention. The antifreeze solution of the present invention is composed of environmentally friendly and sanitary substances which do not exert an adverse effect on living animal and plant life and which are not legally regulated. The antifreeze solution of the present invention does not cause metals to rust and does not freeze even at law temperature. Further, the antifreeze solution of the present invention is environmentally friendly and does not require any complicated wastewater treatment after use.

SUMMARY OF THE INVENTION

The antifreeze solution of the present invention may be added to a heating medium of a heat exchanger or a radiator coolant for an internal combustion car engine. Further, the antifreeze solution of the present invention can be used as an antifreezing agent for preventing the icing of road surfaces or a snow-melting agent.

Specifically, the antifreeze solution of the present invention is characterized by containing glycerin and not containing ethylene glycol.

Further, the antifreeze solution of the present invention may have a freezing point of −20° C. or less, and more specifically it may have a freezing point of −50° C. or less.

In one embodiment, the antifreeze solution of the present invention does not contain ethylene glycol, has a freezing point of −20° C. or less, and can be prepared by mixing the following solutions A and B:

(Solution A) a solution containing glycerin (Solution B) a mixture containing:
- water, as a main component;
- dicarboxylic acid;
- aqueous metal hydroxide solution; and
- one or more of components selected from the group consisting of triazoles, chelating agent, saturated fatty acid, and unsaturated fatty acid.

Further, the antifreeze solution of the present invention may contain propylene glycols.

The aforementioned dicarboxylic acid may be selected from dodecanedioic acid and sebacic acid. Metal hydroxide may be one or more of substances selected form the group consisting of sodium hydroxide, calcium hydroxide, and potassium hydroxide.

The aforementioned triazoles may be tolyltriazole or benzotriazole.

Further, the aforementioned chelating agent may be ethylenediaminetetraacetic acid complex.

The aforementioned saturated fatty acid may be one or more of substances selected from the group consisting of caproic acid, caprylic acid, decanoic acid, lauric acid, myristic acid, palmitic acid, and stearic acid.

The aforementioned unsaturated fatty acid may be one or more of substances selected from the group consisting of oleic acid, vaccenic acid, linoleic acid, linolenic acid, and arachidonic acid.

In another embodiment of the antifreeze solution of the present invention, the solution B may contain: 0 wt % to 20.0 wt % of chelating agent; 0.1 wt % to 10.0 wt % of dicarboxylic acid; 0 wt % to 10.0 wt % of triazoles; 1.0 wt % to 50.0 wt % of saturated fatty acid and/or unsaturated fatty acid; 0.10 wt % to 20.0 wt % of aqueous metal hydroxide solution; and 30.0 wt % to 95.0 wt % of water. One or more of components selected from the group of triazoles, chelating agent, saturated fatty acid, and unsaturated fatty acid may be used within the above range.

In still another embodiment of the present invention, the antifreeze solution may not contain ethylene glycol, may have a freezing point of −20° C. or less, and may be prepared by following solutions A and B:

(Solution A) a solution containing glycerin (Solution B) a mixture containing: 0.5 wt % to 20.0 wt % of ethylenediaminetetraacetic acid complex; 0.1 wt % to 10.0 wt % of dodecanedioic acid; 0.1 wt % to 10.0 wt % of tolyltriazole; 1.0 wt % to 50.0 wt % of caprylic acid and/or oleic acid; 0.10 wt % to 20.0 wt % of aqueous metal hydroxide solution; and 30.0% to 95.0 wt % of water. When the solution B contains both caprylic acid and oleic acid, it may contain 1.0 wt % to 25.0 wt % of caprylic acid and 1.0 wt % to 25.0 wt % of oleic acid.

In a further embodiment of the antifreeze solution of the present invention, the solution B may contain: 1.0 wt % to 10.0 wt % of ethylenediaminetetraacetic acid complex; 0.5 wt % to 5.0 wt % of dodecanedioic acid; 0.5 wt % to 5.0 wt % of tolyltriazole; 2.0 wt % to 20.0 wt % of caprylic acid; 2.0 wt % to 20.0 wt % of oleic acid; 1.0 wt % to 15.0 wt % of aqueous metal hydroxide solution; and 30.0% to 90.0 wt % of water.

In this embodiment, the antifreeze solution may contain dipropylene glycol.

Further, the aforementioned antifreeze solution may contain polyhydric phenols. Such polyhydric phenols may be one or more of substances selected from the group consisting of flavonoid, coumarins, phenylpropanoid, and tannins.

The solution A that contains glycerin may constitute 1 wt % to 99 wt % of the total amount of the antifreeze solution of the present invention.

In the solution A of the antifreeze solution of the present invention, a weight ratio between glycerin and propylene glycol may be 99.5:0.5 to 0.5:99.5.

The aforementioned antifreeze solution may further contain a water glass solution so that it may be used as an antifreezing agent.

A rust inhibitor of the present invention is characterized by comprising:
water as a main component;
dicarboxylic acid;
aqueous metal hydroxide solution; and
one or more of substances selected from the group consisting of triazoles, chelating agent, saturated fatty acid, and unsaturated fatty acid.

The aforementioned dicarboxylic acid may be selected from dodecanedionate and sebacic acid.

The metal hydroxide may be one or more of substances selected form the group consisting of sodium hydroxide, calcium hydroxide, and potassium hydroxide.

The aforementioned triazoles may be tolyltriazole or benzotriazole.

Further, the aforementioned chelating agent may be ethylenediaminetetraacetic acid complex.

The aforementioned saturated fatty acid may be one or more of substances selected from the group consisting of caproic acid, caprylic acid, decanoic acid, lauric acid, myristic acid, palmitic acid, and stearic acid.

The aforementioned unsaturated fatty acid may be one or more of substances selected from the group consisting of oleic acid, vaccenic acid, linoleic acid, linolenic acid, and arachidonic acid.

In one embodiment, the rust inhibitor of the present invention may contain: 0 wt % to 20.0 wt % of chelating agent; 0.1 wt % to 10.0 wt % of dicarboxylic acid; 0 wt % to 10.0 wt % of triazoles; 1.0 wt % to 50.0 wt % of saturated fatty acid and/or unsaturated fatty acid; 0.10 wt % to 20.0 wt % of aqueous metal hydroxide solution; and 30.0 wt % to 95.0 wt % of water.

In another embodiment of the rust inhibitor of the present invention, each component ratio of the solution B may be: 0.5 wt % to 20.0 wt % of ethylenediaminetetraacetic acid complex; 0.1 wt % to 10.0 wt % of dodecanedioic acid; 0.1 wt % to 10.0 wt % of tolyltriazole; 1.0 wt % to 25.0 wt % of caprylic acid; 1.0 wt % to 25.0 wt % of oleic acid; 0.10 wt % to 20.0 wt % of aqueous metal hydroxide solution; and 30.0% to 95.0 wt % of water.

In still another embodiment of the present invention, the rust inhibitor may contain: ethylenediaminetetraacetic acid complex; dodecanedioic acid; tolyltriazole; caprylic acid and/or oleic acid; aqueous metal hydroxide solution; and water.

In a further embodiment of the present invention, the rust inhibitor may contain: 0.5 wt % to 20.0 wt % of ethylenediaminetetraacetic acid complex; 0.1 wt % to 10.0 wt % of dodecanedioic acid; 0.1 wt % to 10.0 wt % of tolyltriazole; 1.0 wt % to 50.0 wt % of caprylic acid and/or oleic acid; 0.1 wt % to 20.0 wt % of aqueous metal hydroxide solution; and 30.0 wt % to 95.0 wt % of water.

The rust inhibitor of the present invention may further contain polyhydric phenols.

The aforementioned polyhydric phenol may be one or more of substances selected from the group consisting of flavonoid, coumarins, phenylpropanoid, and tannins.

Further, the rust inhibitor of the present invention may contain $1 \times 10^{-6}$ wt % to 1 wt % of the polyhydric phenols.

DESCRIPTION OF THE PREFERRED EMBODIMENTS

Figure 1:
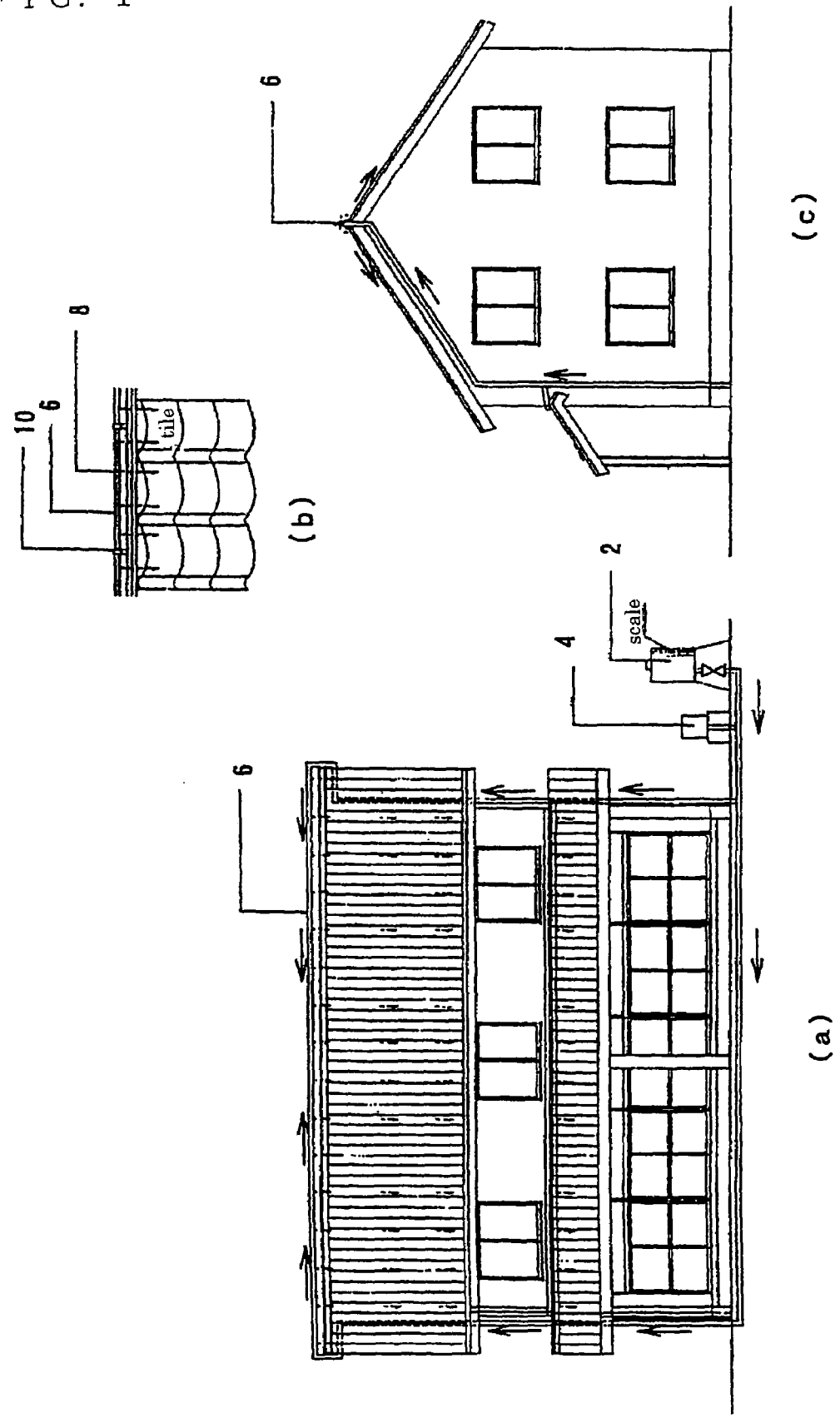
FIG. 1 shows an embodiment in which the antifreeze solution of the present invention is distributed over the roof as a snow-melting agent.

An antifreeze solution of the present invention essentially contains glycerin or a derivative thereof, does not contain ethylene glycol which adversely affects the environment, and has higher performance than conventional antifreeze solutions.

The antifreeze solution of the present invention does not contain any ethylene glycols listed as the "Substances considered as potentially hazardous air-pollutants" (listed in the section 2(9) of the Revision of the Air Pollution Control effected on Apr. 1, 1997) designated by the Environmental Management Bureau of the Ministry of the Environment, Japan. It is possible that the undiluted antifreeze solution of the present invention has a freezing point of −20° C. Even if the solution is cooled to a temperature of −20° C. or less, it is not solidified but semi-frozen. Also, it is possible that the solution has a freezing point of −50° C. or less, depending on the components contained therein.

The antifreeze solution of the present invention may be produced from glycerin or a derivative thereof. For example, the present invention proves that a mixture of 25% of water and 75% of glycerin does not freeze until it is cooled to −90° C.

The antifreeze solution of the present invention is prepared by mixing a solution A which contains glycerin or a derivative thereof and a solution B which contains a specific component. The solution A may contain not only glycerin but also water-soluble alcohols or a derivative thereof. Other components contained in the solution A than glycerin may be glycerin carbonate, acetalification glycerin, sorbitol, and glucose, and preferably ethyl alcohol, methyl alcohol, propylene alcohol, propylene glycol or a derivative thereof. In this specification, the derivative of alcohol may include esterification alcohol and etherification alcohol.

Glycerin or the like provides cooling effect to the antifreeze solution of the present invention and further provides an viscosity suitable for its use. Thus, glycerin or the like has an effect of enhancing the adhesion of the antifreeze solution to an adherend. Further, glycerin or the like contributes to lowering a freezing point of the antifreeze solution if it is mixed with other solvent to prepare a mixed solution. Furthermore, glycerin or the like stabilizes pH. The ratio of glycerin to the solution A is preferably 0.5 wt % to 100 wt %.

In addition to glycerin, the solution A preferably contains propylene glycol. In the solution A, the weight ratio of glycerin to propylene glycol by weight is preferably 99.5:0.5 to 0.5:99.5. In the solution A, the ratio of glycerin to other components may vary depending on uses.

The solution B may basically have effects of protecting metal from rust and lowering a freezing point. The solution B contains water as a main component and also contains dicarboxylic acid, aqueous metal hydroxide solution, and one or more substances selected from the group consisting of triazoles, chelating agent, saturated fatty acid, and unsaturated fatty acid. The solution B may be not only used in the antifreeze solution of the present invention, but also used alone as a rust inhibitor.

As dicarboxylic acid, dodecanedioic acid or sebacic acid may be preferably used. The ratio of dicarboxylic acid in the solution B may be preferably 0.1 wt % to 10.0 wt %.

Examples of metal hydroxide include sodium hydroxide, potassium hydroxide, and calcium hydroxide. Chlorine metal salt is not used. Preferably, these metal hydroxides are used as an aqueous metal hydroxide solution after being dissolved in water. Such aqueous metal hydroxide solution is preferably diluted three to five times with water. Preferably, the ratio of aqueous metal hydride solution in the solution B may be 0.10 wt % to 20.0 wt %.

Examples of triazoles include tolyltriazole and benzotriazole. Preferable ratio of triazoles in the solution B may be 0 wt % to 10.0 wt %.

Examples of chelating agent include ethylenediaminetetraacetic acid complex, nitriloacetic acid, a complex of metal salt thereof, or a complex of ion. Preferable ratio of chelating agent in the solution B may be 0 wt % to 20.0 wt %.

The solution B used in the present invention further contains saturated fatty acid and/or unsaturated fatty acid. Examples of saturated fatty acid include caprylic acid, caproic acid, decanoic acid, lauric acid, myristic acid, palmitic acid, and stearic acid. At least one of them may be selectively used. Examples of unsaturated fatty acid include oleic acid, linoleic acid, and linolenic acid. At least one of them may be selectively used. Such saturated fatty acid and unsaturated fatty acid may be used in combination of one or two or more of them. For example, saturated fatty acid such as caprylic acid and unsaturated fatty acid such as oleic acid may be used as components of the antifreeze solution of the present invention. The preferable ratio of saturated fatty acid and/or unsaturated fatty acid in the solution B may be 0 to 50.0 wt %. If both saturated and unsaturated fatty acids are used, the ratios of the saturated and unsaturated fatty acids may be 1.0 to 25.0 wt %, respectively.

The solution B contains water as the main component. Basically, deionized water, purified water, distilled water, tap water, or mineral water may be used as water. Preferable ratio of water in the solution B may be 30.0 to 95.0 wt %.

The antifreeze solution of the present invention may further contain dipropylene glycol in addition to the aforementioned components. The reason why dipropylene glycol is preferably contained in the antifreeze solution of the present invention is because the pH value of the antifreeze solution is stabilized even under high temperature. In the antifreeze solution of the present invention, the solution B that produces a rust inhibiting effect preferably contains 0.01 wt % to 10.0 wt % of dipropylene glycol. Further, dipropylene glycol can be used as a component of the rust inhibitor of the present invention.

Further, the antifreeze solution of the present invention may contain polyhydric phenols. In this specification, polyhydric phenols may be one or more substances selected from the group consisting of flavonoid, coumarins, phenylpropanoid, and tannins. When such polyhydric phenols is added to the antifreeze solution of the present invention, a metal that is in contact with the solution is hard to burn and the surface of the metal is hard to discolor even under high temperature. In the antifreeze solution of the present invention, the solution B that produces a rust inhibiting effect preferably contains $1 \times 10^{-6}$ wt % to 1 wt % of polyhydric phenols. Examples of flavonoid include: baicalin, chrysin, myricetin, dihydromyricetin, molin, naringin, quercetin, quercitrin, rutin, and wogonin. Examples of coumarins include: coumarin, esculetin, scopoletin, and scopoletin. Examples of phenylpropanoid include: coffeic acid, chlorogenic acid, cinnamic acid, and coumalic acid. Examples of tannins include: epigallocatechin, gallic acid, and tannin.

To the antifreeze solution of the present invention, an antifoaming agent may be added, depending on its uses.

The method of mixing the aforementioned components and the adding sequence are not particularly limited. For example, the components of the solution B may be prepared first and then dissolved in water to produce the solution B of the present invention. Then, the solution B may be mixed with the solution A which contains glycerin. Alternatively, some parts of the solution B may be dissolved in water first and then mixed with the solution A which contains glycerin. Then, the rest of the components of the solution B may be dissolved in the mixed solution. Alternatively, some parts of the solution B and some parts of the solution A which contains glycerin may be mixed first, and then the rest of the components of the solution B and the rest of the solution A which contain glycerin may be mixed.

An embodiment of the present invention may be a mixed solution containing glycerin as the solution A and the following components as the solution B. The components contained in the solution B are: ethylenediaminetetraacetic acid complex; tolyltriazole; dodecanedioic acid; caprylic acid and/or oleic acid; aqueous metal hydroxide solution; dipropylene glycol; polyhydric phenols; particularly chlorogenic acid; and water. The antifreeze solution of the present invention contains no environmentally harmful substances and has an effect of further lowering a freezing temperature in synergetic with the solutions A and B. Further, the antifreeze solution of the present invention has a rust preventing effect and a cleansing effect.

The components of the solution A and solution B may be selected within the aforementioned range depending on uses. When the antifreeze solution of the present invention is used in a radiator, for example, the weight ratio of the solution A to the solution B is preferably 99:1 to 1:99 so as to obtain both a rust preventing effect and an effect of lowering the freezing temperature. Depending on uses, the ratio of the solution A and the solution B contained in the antifreeze solution of the present invention may be selected.

According to one of the preferred embodiments, when the antifreeze solution of the present invention is used as an antifreeze solution for a radiator, the solution A is a solution containing glycerin and the components of the solution B and their volume ratio may be selected as follows.
(1) Solution A: a solution containing glycerin and propylene glycol
(2) Solution B: a mixed solution containing following components: ethylenediaminetetraacetic acid complex;
tolyltriazole;
dodecanedioic acid;
caprylic acid and/or oleic acid;
aqueous metal hydroxide solution;
dipropylene glycol; and
water as a main component.

The antifreeze solution containing these components is particularly preferable in terms of rust preventing effect. More specifically, the antifreeze solution of the present invention contains, for example:
(1) Solution A: a solution containing glycerin and propylene glycol, and
(2) Solution B: a mixture containing the following components:
ethylenediaminetetraacetic acid complex: 0.5 wt % to 20 wt %, preferably 0.5 wt % to 10 wt %;
dodecanedioic acid: 0.1 wt % to 10.0 wt %, preferably 0.5 wt % to 5.0 wt %;
tolyltriazole: 0.1 wt % to 10.0 wt %, preferably 0.5 wt % to 5.0 wt %;
caprylic acid and/or oleic acid: 1.0 wt % to 50.0 wt %,
if both of them are used,
caprylic acid: 1.0 wt % to 25.0 wt %, preferably 2.0 wt % to 20.0 wt %, and oleic acid: 1.0 wt % to 25.0 wt %, preferably 2.0 wt % to 20.0 wt %;
aqueous metal hydroxide solution: 0.10 wt % to 20.0 wt %, preferably 1.0 wt % to 15.0 wt %; and
water: 30.0 wt % to 95.0 wt %, preferably 30.0 wt % to 90.0 wt %.

Further, the antifreeze solution may contain dipropylene glycol. In this case, it is preferable to contain 0.01 wt % to 10.0 wt % of dipropylene glycol. Furthermore, the antifreeze solution may contain chlorogenic acid. In this case, it is preferable to contain $1 \times 10^{-6}$ wt % to 1 wt % of chlorogenic acid.

Further, in the antifreeze solution of the present invention, the solution A may contain not only glycerin but also propylene glycol. The weight ratio of glycerin and propylene glycol is 99.5:0.5 to 0.5:99.5.

It has been shown that the antifreeze solution of the present invention containing the aforementioned components has a low freezing point due to glycerin and also has preferable effects in synergy with a rust preventing effect and an effect of further lowering a freezing temperature of the solution B.

Preferably, the antifreeze solution of the present invention has a hydrogen-ion concentration of pH7.0 to pH13.0, preferably pH7.0 to pH12.0. The antifreeze solution whose pH value is adjusted within the above range by changing the compounding ratio depending on uses can prevent corrosion on the surface of various metals such as copper, aluminum, iron steel and alloys thereof.

For example, the aforementioned antifreeze solution is diluted fifteen times with distilled water to prepare a diluted solution with a pH value of 9.0 to 9.5. Even if a cast iron is immersed in the diluted solution for 48 hours, rust does not form on the iron.

Further, in one embodiment, the antifreeze solution contains 75% of the solution A prepared using glycerin and 25% of the solution B prepared in the manner described in the preparation example 1. In this case, the antifreeze solution has a freezing point of −107.8° C., which proves its marked antifreezing effect.

The antifreeze solution of the present invention has not only a rust preventing effect but also a cleansing effect. For example, if the present invention is used as an antifreeze solution for circulating through a car radiator, engine, or piping made of metal, it protects them from rust. Therefore, the antifreeze solution of the present invention can not only be used as an antifreeze solution for a car but can also be used as a coolant in an engine cooling apparatus for an airplane which flies through the troposphere or stratosphere where the temperature is below zero or can be used in the field of aerospace. Furthermore, if the antifreeze solution of the present invention is used for a long period of time, precipitate is hard to form in the solution and its excellent antifreezing effect and rust preventing effect last. Therefore, there is no need to change the solution periodically.

Further, the antifreeze solution of the present invention can be applied to latent heat storage and therefore can be used as a heating medium such as floor heating and ice thermal storage system.

The antifreeze solution of the present invention is not prepared using raw materials which require a special waste liquid treatment. Therefore, the waste solution does not exert an adverse effect on the environment, so that it can be disposed of after being treated by a general waste water treatment.

Furthermore, in another embodiment, the aforementioned antifreeze solution can be used as an antifreezing agent. Where the solution of the present invention is used as an antifreezing agent, it is distributed over roads, parking areas, and the like, which are surfaced with asphalt, concrete, tiles or the like, to prevent the buildup of ice and snow thereon.

Where the solution of the present invention is used as an antifreezing agent, it is preferable to add a thickener to the solution so as to increase adhesion of the solution to the road or the like. The thickener is not particularly limited as far as it can provide a thickening effect to the solution even under a low temperature. Examples of thickener include: bentonite, alminosilicate, nonionic cellulose derivative such as hydroxyethyl cellulose, methyl cellulose, ethyl cellulose, hydroxypropyl methylcellulose, hydroxyethyl methylcellulose, hydroxypropyl ethylcellulose, hydroxyethyl ethylcellulose, and water glass. Such thickeners may be used alone or in combination. A mixture of an aqueous solution of such thickeners and the antifreeze solution of the present invention can be preferably used as an antifreezing agent.

Water glass is diluted two to ten times with water, for example. The volume ratio of the above-prepared antifreeze solution to water glass solution is preferably 1:2 to 2:1. Thus-prepared solution is diluted with an appropriate amount of water so as to obtain a preferable freezing range depending on ambient temperature and is distributed over the roads and parking areas. Moreover, the prepared solution used for the above-mentioned antifreezing agent gets ratings equivalent to water on a slip test using a running vehicle even when the solution is used without any dilution.

Further, when the above-prepared antifreeze solution that is used as an antifreezing agent is distributed over icy roads, ice formed over the roads is thawed. The solution having a temperature of about 30 to 40° C. is most effectively used to thaw the ice over the road.

Since the antifreeze solution of the present invention has a low freezing point, it has a good snow-melting effect. Therefore, the antifreeze solution of the present invention can be preferably used as a snow-melting agent. When the antifreeze solution of the present invention is used as a snow-melting agent, snow melts into water over time and is mixed with the solution, thus diluting the solution. The antifreeze solution of the present invention can keep a much lower freezing temperature than zero degree, even if the concentration of the solution A becomes low. Therefore, the snow-melting effect of the antifreeze solution of the present invention can last for a long period of time.

As the content of the solution A containing glycerin is higher, the antifreeze solution of the present invention has a lower freezing temperature. The antifreeze solution has a unique characteristic that its freezing point becomes $-100°$ C. or less when it contains 70% of the solution A, preferably 75%, and more preferably 80%. Therefore, when the antifreeze solution with a high content of the solution A is distributed as a snow-melting agent, snow melts for a short period of time. Even if the antifreeze solution of the present invention is diluted with snowmelt, its excellent snow-melting effect can last for a long period of time.

By distributing the antifreeze solution of the present invention over the roof of a house when it snows, the amount of snow built up on the roof can be decreased. Conventionally, a technique for distributing water or hot water over the roof has been well-known. However, when it snows, the temperature is 0° C. or less and water freezes at 0° C. or less. Therefore, the water distributed over the roof may possibly freeze when it contacts the roof or it may possibly freeze unless it is continuously distributed over the roof. However, the antifreeze solution of the present invention does not freeze below 0° C., so that it does not freeze during its distribution over the roof. Further, if the distribution of the antifreeze solution of the present invention is stopped, the antifreeze solution needs more time to dry out than water does, so that it can be kept in a wet condition. Thus, the antifreeze solution of the present invention can keep the snow-melting effect even if it is diluted as described above, so that it does not have to be distributed without stop.

For example, using a device as shown in FIGS. 1(a), 1(b), and 1(c), the antifreeze solution of the present invention can be distributed over the roof. In FIGS. 1(a) to 1(c), the numeral 2 is a tank for storing the antifreeze solution of the present invention, the numeral 4 is a pressure pumping up the antifreeze solution, and the numeral 6 is a perforated pipe for distributing the antifreeze solution over the roof. Holes 10 of the perforated pipe 6 are provided towards both sides of the roof. A numeral 12 is a fixing device for fixing the perforated pipe on the roof. In these figures, an arrow shows the direction in which the antifreeze solution flows.

The aforementioned antifreeze solution of the present invention contains the solution B as an essential component that exhibits the rust preventing effect.

Further, the rust inhibitor of the present invention may be composed of the same components as the solution B. In other words, the solution B may be used alone as a rust inhibitor.

Specifically, the rust inhibitor of the present invention essentially contains water as a main component, dicarboxylic acid, and aqueous metal hydroxide solution, and it may further contain one or more substances selected from the group consisting of triazoles, chelating agent, saturated fatty acid, and unsaturated fatty acid.

The same components used in the aforementioned antifreeze solution may be used as dicarboxylic acids, triazoles, saturated fatty acid, chelating agent, unsaturated fatty acid, and metal hydroxide in the rust inhibitor of the present invention.

Also, the ratio of components may be the same as described in the antifreeze solution.

One embodiment of the rust inhibitor of the present invention may contain: ethylenediaminetetraacetic acid complex; dodecanedioic acid; tolyltriazole; caprylic acid; oleic acid; aqueous metal hydroxide solution; and water. The rust inhibitor composed of such components contains no environmentally harmful substances and has a rust preventing effect and a cleansing effect.

As an example of the component ratios, the rust inhibitor of the present invention contains: ethylenediaminetetraacetic acid complex: 0.5 wt % to 20.0 wt %, preferably 1.0 wt % to 10.0. wt %;

dodecanedioic acid: 0.1 wt % to 10.0 wt %, preferably 0.5 wt % to 5.0 wt %;

tolyltriazole: 0.1 wt % to 10.0 wt %, preferably 0.5 wt % to 5.0 wt %;

caprylic acid: 1.0 wt % to 25.0 wt %, preferably 2.0 wt % to 20.0 wt %;

oleic acid: 1.0 wt % to 25.0 wt %, preferably 2.0 wt % to 20.0 wt %;

aqueous metal hydroxide solution: 0.01 wt % to 20.0 wt %, preferably 1.0 wt % to 15.0 wt %; and water: 30.0 wt % to 95.0 wt %, preferably 30.0 wt % to 90.0 wt %.

In Another embodiment, the rust inhibitor of the present invention may further contain dipropylene glycol. It is preferable to add dipropylene glycol to the rust inhibitor of the present invention because dipropylene glycol stabilizes the pH value of the rust inhibitor even if the rust inhibitor is worked in high temperature condition. Preferably, the rust inhibitor of the present invention may contain 0.01 wt % to 10.0 wt % of dipropylene glycol. In still another embodiment, the rust inhibitor of the present invention may contain polyhydric phenols. Such polyhydric phenols may be one or more of substances selected from the group consisting of flavonoid, coumarins, phenylpropanoid, and tannins. When polyhydric phenols are contained in the rust inhibitor of the present invention, metal that is in contact with the solution is not burnt even when it is worked under high temperature condition, and the surface of the metal is hard to be discolored. The rust inhibitor of the present invention may contain $1\times10^{-6}$ wt % to 1 wt % of polyhydric phenols. Examples of flavonoid include: baicalin, chrysin, myricetin, dihydromyricetin, molin, naringin, quercetin, quercitrin, rutin, and wogonin. Examples of coumarins include: coumarin, esculetin, scopoletin, and scopoletin. Examples of phenylpropanoid include: coffeic acid, chlorogenic acid, cinnamic acid, and coumalic acid. Examples of tannins include: epigallocatechin, gallic acid, and tannin.

The aforementioned rust inhibitor may be used as a metal working fluid for working various metals such as copper, aluminum, iron, steel, and alloys thereof, a fluid for preserving metal parts, or a cooling fluid for a radiator.

While the embodiments of the present invention have thus been described, it should be understood that the present invention be not limited to these embodiments. Many changes, modifications, and improvements can be made to the embodiments on the basis of knowledge of those skilled in the art without departing from the scope of the invention.

The embodiments of the present invention will be described below.

EXAMPLES

Preparation Example 1 for a Solution B-1

50 g of EDTA.Na salt (product name: Kurewatto, produced by Teikoku Chemical Industries Co., Ltd.), 14.5 g of dodecanedioic acid, 12.5 g of tolyltriazole (product name: TT-130, produced by Jouhoku Chemical Industries Co., Ltd.), 130 g of caprylic acid, 125 g of oleic acid, 450 g of water, 150 g of aqueous sodium hydroxide solution (33% diluted, pH11 to pH13) and 68 g of polyalkylene glycol (product name: Disuhomu LE-120R) were prepared and mixed to make a solution B-1.

Example 1

A solution A (100 wt % of glycerin) and the solution B-1 prepared in the aforementioned Preparation Example B-1 were blended in a weight ratio of 5:95 (Example 1-1), 10:90(Example 1-2), 15:85(Example 1-3), 20:80(Example 1-4), 25:75(Example 1-5), 30:70(Example 1-6), 50:50(Example 1-7), and 75:25(Example 1-8). Freezing temperatures of the respective mixed solutions were measured using a differential scanning calorimeter (produced by Seiko Instruments Inc., scanning rate of 5° C./min). Table 1 shows a compounding ratio of the solution A and the solution B-1 and a freezing temperature.

TABLE 1

|  | Solution A (glycerin) wt % | Solution B wt % | Freezing temperature ° C. |
|---|---|---|---|
| Example 1-1 | 5 | 95 | −25 |
| Example 1-2 | 10 | 90 | −25 |
| Example 1-3 | 15 | 85 | −26 |
| Example 1-4 | 20 | 80 | −39 |
| Example 1-5 | 25 | 75 | −40 |
| Example 1-6 | 30 | 70 | −50 |
| Example 1-7 | 50 | 50 | −50 |
| Example 1-8 | 75 | 25 | −107 |

Preparation Example 2 for Undiluted Antifreeze Solution (1)

A solution A (100 wt % of glycerin) and a solution B prepared in the Preparation Example 1 were mixed in the ratio of 7:3 to prepare an antifreeze solution of the present invention.

Example 2

The antifreeze solution (1) prepared in the Preparation Example 2 was diluted with purified water and the freezing temperature of the present invention was measured. The antifreeze solution (1) prepared in the Preparation Example 2 and the purified water were blended in the ratio of 100:0 (Example 2-1), 50:50 (Example 2-2), 30:70 (Example 2-3), and 20:80 (Example 2-4). Freezing temperatures of the respective solutions were measured. Table 2 shows compounding ratios, pH values, and freezing temperatures of the respective solutions.

TABLE 2

|  | Antifreeze solution prepared in the Preparation Example 2 wt % | water wt % | ph | Freezing temperature ° C. |
|---|---|---|---|---|
| Example 2-1 | 100 | 0 |  | −40 to −45 |
| Example 2-2 | 50 | 50 | 11–12 | −30 to −35 |
| Example 2-3 | 30 | 70 | 11–12 | −15 to −20 |
| Example 2-4 | 20 | 80 | 10–11 | −10 to −15 |

Example 3

The antifreeze solution (1) prepared in the Preparation Example 2 was diluted with distilled water to prepare a 5% diluted solution (Example 3-1), 10% diluted solution (Example 3-2), 15% diluted solution (Example 3-3), 20% diluted solution (Example 3-4), 25% diluted solution (Example 3-5), and 30% diluted solution (Example 3-6). The diluted solutions were left in a refrigerator (HPFDOMFT3, produced by Hoshizaki Electric Co., Ltd.) at −15° C. for 6 hours, and then the states of the respective solutions were observe. Results of the visual observations are shown in Table 3.

TABLE 3

|  | Sample solution | State of the solution after left alone for 6 hours |
|---|---|---|
| Example 3-1 | 5% diluted solution | frozen |
| Example 3-2 | 10% diluted solution | frozen |
| Example 3-3 | 15% diluted solution | frozen |
| Example 3-4 | 20% diluted solution | semi-frozen |
| Example 3-5 | 25% diluted solution | liquid state (stickier) |
| Example 3-6 | 30% diluted solution | liquid state |

Example 4

(Rust Preventing Test)

Strips of cast iron, iron, copper alloy, aluminum #4000, aluminum #5000, aluminum #6000, and aluminum #7000 were soaked in a solution (pH 9.0 to pH9.5) which was prepared by diluting the antifreeze solution prepared in the Preparation Example 2 fifteen times with distilled water at 50° C. for 48 hours. No rust was formed on the cast iron and iron strips. The strips of copper alloy and aluminum were not discolored.

Preparation Example 3 for Antifreeze Solution (2)

30 wt % of glycerin, 61 wt % of propylene glycol, and 9 wt % of the solution B-1 prepared in the Preparation Example 1 were blended.

Example 5

30 wt % of the antifreeze solution (2) prepared in the aforementioned preparation example 3 was diluted with 70 wt % of distilled water. Strips of aluminum #7000, aluminum alloy for an engine, copper, brass, cast iron, and lead-tin solder were soaked in the diluted solution and left in a warm chamber (CI-410, Toyo Engineering Works, Ltd.) at 60° C. for 420 hours. Results are shown in Table 4. In Table 4, the mark "x" indicates that no change was observed on a strip.

TABLE 4

| | | Sample | | | | | |
|---|---|---|---|---|---|---|---|
| | conditions | Aluminum #7000 | Copper | Brass | Cast iron | Lead-tin solder | Aluminum alloy for engine |
| Example 5 | 60° C., 420 hours | x | x | x | x | x | x |
| Comparative Example 1 | 60° C., 420 hours | Color is somewhat changed. | Color is changed. | Color is changed | x | | |

Comparative Example 1

Strips of aluminum #7000, copper, brass, and cast iron were soaked in a commercially-available antifreeze solution (Coolant Replenisher Green produced by Nisseki Mitsubishi Oil Corporation) under the same conditions as described in Example 5. Results are shown in Table 4.

While the strips of aluminum #7000, copper, and brass soaked in the commercially-available antifreeze solution were discolored, the strips of aluminum #7000, copper, and brass soaked in the antifreeze solution of the present invention were not discolored. Like the strip of cast iron soaked in the commercially-available antifreeze solution, the strip of iron cast soaked in the antifreeze solution of the present invention was not discolored.

Example 6

The antifreeze solution (2) prepared in the aforementioned Preparation Example 3 and distilled water were blended in the weight ratio of 50:50 (Example 6-1) and 30:70 (Example 6-2), respectively. Also, a solution prepared by mixing 90 wt % of glycerin and 10 wt % of the solution B and distilled water were mixed in the weight ratio of 50:50 (Example 6-3). The solutions were left at −24° C. for 900 hours, respectively. Table 5 shows the compounding ratio, dilution ratio, and results of visual observations of the respective sample solutions.

TABLE 5

| | Antifreeze solution | | | Dilution ratio | | |
|---|---|---|---|---|---|---|
| | Glycerin wt % | Propylene glycol wt % | Solution B wt % | Antifreeze solution wt % | water wt % | Visual observation |
| Example 6-1 | 31 | 60 | 9 | 30 | 70 | Semi-frozen |
| Example 6-2 | 31 | 60 | 9 | 50 | 50 | Liquid state |
| Example 6-3 | 90 | | 10 | 50 | 50 | Liquid state turbid |

Preparation Example 4 for a Solution B-2

30 g of EDTA.Na salt (Product name: Kurewatto, produced by Teikoku Chemical Industries Co., Ltd.), 10 g of dodecanedioic acid, 7 g of tolyltriazole (product name: TT-130, produced by Jouhoku Chemical Industries Co., Ltd.), 110 g of caprylic acid, 50 g of oleic acid, 130 g of aqueous potassium hydroxide solution (33% diluted, pH11 to pH13), and 663 g of water were prepared and mixed to make a solution B-2.

Preparation Example 5 for Antifreeze Solution (3)

95 wt % of propylene glycol, 1 wt % of glycerin, and 4 wt % of the solution B-2 prepared in the Preparation Example 4 were blended.

Example 7

330 ml of the antifreeze solution of the present invention prepared in the Preparation Example 5 was diluted with 670 ml of distilled water. Strips of aluminum #7000, aluminum alloy for engine, copper, brass, cast iron, steel, and lead-tin solder were soaked in the antifreeze solution (3), left in the refrigerator (HPFDOMFT3, produced by Hoshizaki Electric Co., Ltd.) at −21° C. for 360 hours or boiled to 100° C. in a warmer (Tiger VE vacuum electric pot) every 12 hours to keep the temperature 98° C. for 360 hours. Results are shown in Table 6. The mark "x" indicates that no change was observed on a strip.

TABLE 6

| | | Sample | | | | | |
|---|---|---|---|---|---|---|---|
| | Conditions | Aluminum #700 | Copper | Brass | Cast iron | Steel | Lead-tin solder |
| Example 7 | −21° C., 360 hours | X | X | X | X | X | X |
| Example 7 | 98° C., 360 hours | X | X | X | X | X | X |

Preparation Example 6 for Antifreeze Solution (4)

The solution B-1 prepared in the Preparation Example 1, glycerin, and an aqueous solution prepared by diluting 500 g of sodium silicate (produced by Arakawa Kagaku Kogyo Co.) 20 times with 60 g of purified water were mixed in the weight ratio of 1:7:1.

Example 8

(Slip Test)
The Corolla (Toyota Motor Corporation) was driven at a speed of 50 km/h and braked suddenly. The distance between the position where the car was braked and the position where the car stopped was measured (fair weather, temperature: 25° C.). The road was paved with asphalt. Water and the antifreeze solutions (4) of the present invention prepared in the Preparation Example 6 which were diluted at various dilution ratio were distributed over the road. Slip tests were conducted on the road paved with asphalt under the following conditions:

Example 8-1

No antifreeze solution was distributed over the road.

Example 8-2

Three times diluted antifreeze solution of the present invention was distributed over the road.

Example 8-3

Five times diluted antifreeze solution was distributed over the road.

Example 8-4

Ten times diluted antifreeze solution was distributed over the road.

Example 8-5

Tap water was distributed over the road.

Example 8-6

The tires of the car were covered over with sand, and three times diluted antifreeze solution of the present invention was distributed over the road.

Results of the tests are shown in Table 7.

TABLE 7

| | | | Stop position | | |
|---|---|---|---|---|---|
| | Solution distributed over asphalt road | tire | First brake | Second brake | Third brake |
| Example 8-1 | No solution was distributed. | | 7.3 m | 7.4 m | 7.7 m |
| Example 8-2 | Three times diluted antifreeze solution | | 9.4 m | 9.9 m | 10.6 m |
| Example 8-3 | Five times diluted antifreeze solution | | 10.7 m | 10.8 m | 11.5 m |
| Example 8-4 | Ten times diluted antifreeze solution | | 10.8 m | 10.4 m | 10.9 m |
| Example 8-5 | Tap water | | 10.1 m | 9.8 m | 11.1 m |
| Example 8-6 | Three times diluted antifreeze solution | Adhesion of sand | 12.1 m | 10.9 m | — |

As clear from the results of the slip test shown in Table 7, no obvious difference was found between the roads over which the variously diluted antifreeze solutions were distributed and the road over which tap water was distributed, regardless of dilution ratios of the solution. In other words, the car slipped on the road over which the variously diluted antifreeze solution of the present invention were distributed in the same manner that it did on the road over which water was distributed.

Preparation Example 7 for Solution B-3

20 g of EDTA.Na salt (Product name: Kurewatto, produced by Teikoku Chemical Industries Co., Ltd.), 14 g of dodecanedioic acid, 10 g of tolyltriazole (product name: TT-130, produced by Jouhoku Chemical Industries Co., Ltd.), 75 g of caprylic acid, 75 g of oleic acid, 130 g of aqueous potassium hydroxide solution (33% diluted, pH11 to pH13) and 40 g of dipropylene glycol, 10 g of chlorogenic acid water (a solution prepared by diluting 1 g of chlorogenic acid produced by Wako Chemical Co. with 4 liters of distilled water), and 626 g of water were prepared and mixed to make a solution B-3.

Preparation Example 8 for Antifreeze Solution 30 wt % of the solution A (a mixed solution of 95 wt % of propylene glycol and 5 wt % of glycerin) and 3 wt % of the solution B-3 prepared in the Preparation Example 7, and 67 wt % of water to make an antifreeze solution.

Example 9

Strips of aluminum #7000, aluminum alloy for an engine, copper, brass, cast iron, steel, and lead-tin solder were soaked in the solution prepared in the aforementioned Preparation Example 8 and left in the refrigerator (HPFDOMFT3, produced by Hoshizaki Electric Co., Ltd.) at −21° C. for 360 hours or boiled to 100° C. in a warmer (Tiger VE vacuum electric pot) every 12 hours to keep the temperature 98° C. for 1200 hours. Results are shown in Table 8. The mark "x" indicates that no change was observed on a strip.

TABLE 8

|  | Conditions | Aluminum #7000 | Copper | Brass | Cast iron | Steel | Solder lead-tin | Aluminum alloy for engine |
|---|---|---|---|---|---|---|---|---|
| Example 9 | −21° C. 1200 hours | x | x | x | x | x | x | x |
| Example 9 | 98° C. 1200 hours | x | x | x | x | x | x | x |

INDUSTRIAL APPLICABILITY

As described above, the antifreeze solution of the present invention contains novel components. More specifically, the antifreeze solution of the present invention does not contain any environmentally harmful chemical substances such as ethylene glycol specified by the Ministry of the Environment, Japan, but it contains various particular substances with water as a main component. Therefore, the undiluted antifreeze solution of the present invention does not freeze at −20° C. or less at normal pressures, or even it does not freeze even at −50° C. or less but it remains in a liquid state. The antifreeze solution of the present invention can be diluted with water depending on anti-freeze effect and rust prevent effect desired in various fields. Therefore, the anti-freeze solution is easy to use and environmentally friendly, and the wasted solution also does not contain any environmentally harmful substances, so that it can be easily treated for disposal.

Further, the antifreeze solution of the present invention can be used as a cooling water for a radiator provided to the engine even in cold climate areas. Further, the antifreeze solution of the present invention can be also used as an ice thermal storage system for cooling a floor and a building which can save electric energy. Furthermore, the antifreeze solution of the present invention can be used as a cold insulator for foods and chemicals, thus having various uses. The antifreeze solution of the present invention can prevent freezing of the road surface by adding certain amount of water glass to the solution, properly diluting it, and then distributing it over the road.

The antifreeze solution of the present invention can be used as a coolant in an engine cooling apparatus for a car or an airplane and as a heating medium for a floor heating or ice thermal storage system, thus having various uses such as preventing freezing the road. Further, the antifreeze solution of the present invention has a rust preventing effect and a cleansing effect. After use, the wasted antifreeze solution does not exert adverse effects on the environment, so that it can be disposed of after being treated by a general waste water treatment.

The rust inhibitor of the present invention can be used as an essential component of the antifreeze solution of the present invention. It can also be used alone as a metal working fluid or as a fluid for preserving metal parts. Thus it has an excellent rust preventing effect. Like the antifreeze solution of the present invention, the rust inhibitor of the present invention is also easy to use and environmentally friendly, and does not contain any environmentally harmful substances, so that it can be easily treated for disposal.

There has thus been shown and described a novel antifreeze solution and rust inhibitor added thereto which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A rust inhibitor comprising:
   0 wt % to 20.0 wt % of chelating agent;
   0.1 wt % to 10.0 wt % of dicarboxylic acid;
   0 wt % to 10.0 wt % of triazoles;
   1.0 wt % to 50.0 wt % of at least one of a saturated fatty acid and an unsaturated fatty acid;
   0.10 wt % to 20.0 wt % of aqueous metal hydroxide solution; and
   30.0 wt % to 95.0 wt % of water.

2. The rust inhibitor according to claim 1, wherein said dicarboxylic acid is selected from dodecanedioic acid and sebacic acid.

3. The rust inhibitor according to claim 1, wherein said metal hydroxide is one or more of substances selected from the group consisting of sodium hydroxide, calcium hydroxide, and potassium hydroxide.

4. The rust inhibitor according to claim 1, wherein said triazoles are tolyltriazole or benzotriazole.

5. The rust inhibitor according to claim 1, wherein said chelating agent is ethylenediaminetetraacetic acid complex.

6. The rust inhibitor according to claim 1, wherein said saturated fatty acid is one or more of substances selected from the group consisting of caproic acid, caprylic acid, decanoic acid, lauric acid, myristic acid, palmitic acid, and stearic acid.

7. The rust inhibitor according to claim 1, wherein said unsaturated fatty acid is one or more of components selected from the group consisting of oleic acid, vaccenic acid, linoleic acid, linolenic acid, and arachidonic acid.

8. A rust inhibitor comprising:
   ethylenediaminetetraacetic acid complex;
   dodecanedioic acid;
   tolyltriazole;
   at least one of caprylic acid and oleic acid;
   aqueous metal hydroxide solution; and
   water.

9. The rust inhibitor according to claim 8, further comprising dipropylene glycol.

10. The rust inhibitor according to claim 8, further comprising polyhydric phenols.

11. The rust inhibitor according to claim 9, further comprising polyhydric phenols.

* * * * *